United States Patent [19]

Greivenkamp, Jr. et al.

[11] Patent Number: 5,075,560
[45] Date of Patent: Dec. 24, 1991

[54] MOIRE DISTANCE MEASUREMENTS USING A GRATING PRINTED ON OR ATTACHED TO A SURFACE

[75] Inventors: John E. Greivenkamp, Jr.; Russell J. Palum, both of Rochester, N.Y.

[73] Assignee: Eastman Kodak Company, Rochester, N.Y.

[21] Appl. No.: 584,984

[22] Filed: Sep. 20, 1990

[51] Int. Cl.$^5$ .............................................. G01V 9/04
[52] U.S. Cl. ................................. 250/561; 356/374; 250/237 G
[58] Field of Search ................... 250/560, 561, 201.7, 250/237 G; 356/1, 4, 356, 401, 374, 376

[56] References Cited

U.S. PATENT DOCUMENTS

| | | |
|---|---|---|
| 2,206,606 | 9/1965 | Burgo et al. |
| 2,867,149 | 1/1959 | Goddard |
| 2,977,847 | 4/1961 | Meyer-Arendt |
| 3,166,624 | 1/1965 | Vargady |
| 3,245,307 | 4/1966 | de Lang |
| 3,330,961 | 7/1967 | Juengst et al. |
| 3,427,109 | 2/1969 | Beattie et al. |
| 3,572,942 | 3/1971 | Te Kronnie et al. |
| 3,589,817 | 6/1971 | Sugaya |
| 3,604,813 | 9/1971 | Te Kronnie et al. |
| 3,663,107 | 5/1972 | Denis et al. |
| 3,674,372 | 7/1972 | Weyrauch |
| 3,759,618 | 9/1973 | Rogers et al. |
| 3,815,998 | 6/1974 | Tietze |

(List continued on next page.)

FOREIGN PATENT DOCUMENTS

| | | |
|---|---|---|
| 7737103 | 7/1979 | France |
| 98634 | 12/1980 | German Democratic Rep. |
| 56-75004 | 6/1981 | Japan |
| 58-34309 | 2/1983 | Japan |
| 58-35406 | 3/1983 | Japan |
| 58-115313 | 7/1983 | Japan |
| 58-169012 | 10/1983 | Japan |
| 58-206908 | 12/1983 | Japan |
| 59-23205 | 2/1984 | Japan |
| 61-169702 | 1/1985 | Japan |
| 60-257306 | 12/1985 | Japan |

OTHER PUBLICATIONS

T. K. Dehmel in *Instruments and Control Systems*, vol. 39, No. 6, Jun. 1966, pp. 123-124.
T. K. Dehmel in *SPIE Journal*, vol. 5, Feb.-Mar. 1967, pp. 91-94.
R. S. Schools, et al., in the *IBM Technical Disclosure Bulletin*, vol. 10, No. 3, Aug. 1967, pp. 278-279.
R. W. Harrison, in the *IBM Technical Disclosure Bulletin*, vol. 12, No. 10, Mar. 1970, p. 1643.
C. H. Hammond et al., in the *IBM Technical Disclosure Bulletin*, vol. 14, No. 1, Jun. 1971, pp. 49-50.
H. Takasaki, in *Proceedings of the 12th Int'l Congress on High Speed Photography*, Toronto, 1-7 Aug. 1976, pp. 30-36.
C. H. Herman et al., in the *Western Electric Technical Digest*, No. 44, Oct. 1976, pp. 27-28.
O. Kafri et al., in *Applied Optics*, vol. 20, No. 18, Sep. 15 1981, pp. 3098-3100.

Primary Examiner—David C. Nelms
Assistant Examiner—Que T. Le
Attorney, Agent, or Firm—Charles E. Snee, III

[57] ABSTRACT

Method and apparatus are disclosed for providing Moire distance and displacement measurements of a diffusely reflective surface of an object or support. More particularly, a first grating is physically located, formed, or printed on the diffusely reflective surface. An image of the first grating is formed on a second grating by an imaging means for generating a Moire pattern behind the second grating. At an initial position of the diffusely reflective surface relative to the imaging means, the periods of the image of the first grating and the second grating match. Movement of the diffusely reflective surface in a direction normal thereto and away from the initial position produces a spatially varying intensity pattern caused by the Moire between a shifting and changing magnified pattern of the image of the first grating and a pattern of the second grating. The temporal intensity changs in the Moire pattern are detected and are used to produce information related to the instantaneous distance and displacement of the diffusely reflective surface from the initial position.

19 Claims, 3 Drawing Sheets

U.S. PATENT DOCUMENTS

| | | |
|---|---|---|
| 3,847,484 | 11/1974 | Gropper et al. . |
| 4,044,377 | 8/1977 | Bowerman . |
| 4,051,483 | 9/1977 | Suzuki . |
| 4,102,578 | 7/1978 | Suzuki et al. . |
| 4,125,025 | 11/1978 | Suzuki et al. . |
| 4,139,291 | 2/1979 | Frosch et al. . |
| 4,202,630 | 5/1980 | Suzuki et al. . |
| 4,212,073 | 7/1980 | Balasubramanian . |
| 4,226,538 | 10/1980 | Van Beeck . |
| 4,272,196 | 6/1981 | Indebetouw . |
| 4,459,027 | 7/1984 | Kafri et al. . |
| 4,488,172 | 12/1984 | Hutchin . |
| 4,499,492 | 2/1985 | Hutchin . |
| 4,525,858 | 6/1985 | Cline et al. . |
| 4,553,839 | 11/1985 | Kafri et al. . |
| 4,577,940 | 3/1986 | Krasinski et al. . |
| 4,614,864 | 9/1986 | Wu . |
| 4,619,527 | 10/1986 | Leuenberger et al. . |
| 4,672,564 | 6/1987 | Egli et al. . |
| 4,673,817 | 6/1987 | Oomen . |
| 4,722,600 | 2/1988 | Chiang . |
| 4,722,605 | 2/1988 | Livnat et al. ............... 356/374 |
| 4,776,698 | 10/1988 | Crosdale . |
| 4,794,550 | 12/1988 | Greivenkamp . |
| 4,796,200 | 1/1989 | Prior . |
| 4,800,547 | 1/1989 | Kessels et al. ............... 250/237 G |
| 4,810,895 | 3/1989 | Kafri et al. . |
| 4,867,570 | 9/1989 | Sorimachi et al. . |
| 4,988,886 | 1/1991 | Palum et al. ............... 250/561 |
| 5,003,600 | 3/1991 | Deason et al. ............... 250/237 G |

MOIRE DISTANCE MEASUREMENTS USING A GRATING PRINTED ON OR ATTACHED TO A SURFACE

FIELD OF THE INVENTION

The present invention relates to a technique for providing Moire distance measurements of a diffusely reflective surface of an object or support.

BACKGROUND OF THE INVENTION

Optically examining a surface with specular or diffuse reflection for defects during, or immediately after, a manufacturing process has included many different techniques. For example, U. S. Pat. No. 2,867,149 (issued to C. T. Goddard on Jan. 6, 1959) describes a first technique which uses a grating of fine wires, or ruled lines, positioned at an angle to a surface to be measured or examined. Parallel rays of light are then projected through the grating to impinge the surface at an acute angle. When viewed from directly above the surface, the shadows of the grating elements are straight for flat surfaces and non-straight for any deviation in height of the surface. Such technique might be termed a "Zebra" test because of the pattern of light and dark areas generated on the surface. Such technique is capable of seeing surface features of a predetermined minimal size depending on the period (spacing) of the lines of the grating.

A second technique is the well-known Ronchi test, wherein light from a light source is projected through a grating onto a curved reflective surface (e.g., a mirror) under test. The grating comprises alternating opaque and non-opaque parallel areas, and is imaged on itself. An observer images the optical curved surface under test through the grating. Therefore, in a normal Ronchi test, there is literally one grating, and both the light source and the viewing means or eye forming the observer are closely spaced and look through the single grating. In this regard, see, for example, a modified Ronchi test arrangement for measuring a flat surface described by R. W. Harrison in the *IBM Technical Disclosure Bulletin*, Vol. 12, No. 10, March 1970 at page 1643. In the Harrison arrangement, two lenses are needed to make up for the loss of the curved surface used in the classical Ronchi test.

U.S. Pat. No. 4,810,895 (issued to O. Kafri et al. on Mar. 7, 1989) discloses a third technique for optically examining the surface of an object using Moire ray deflection mapping. With this Moire ray deflection mapping arrangement, light reflected from the surface of an object to be measured is collimated and directed through a first and a second closely spaced grating. The gratings are located at a preselected angular orientation with respect to each other to produce a Moire fringe pattern that provides an indication of the properties of the examined surface. In Moire techniques, the detector (observer/camera) is generally located immediately behind the second grating, or at the image of the first grating on the second grating. For other Moire grating arrangements see, for example, U.S. Pat. No. 3,166,624 (issued to L. O. Vargady on Jan. 19, 1965); and U.S. Pat. Nos. 3,572,924 and 3,604,813 (issued to G. H. Te Kronnie et al. on Mar. 30, 1971 and Sept. 14, 1971, respectively).

Moire techniques are also used to detect a distance or displacement of a surface. Such Moire distance measuring techniques can be used for surface contour measurements or for positioning the surface of an object relative to another object or surface. For example, U.S. Pat. No. 4,733,605 (issued to Livnat et al. on Feb. 2, 1988) discloses a Moire distance measurement method and apparatus useful for the non-contact measurement of small displacements of a specularly reflective surface with a high degree of accuracy. The technique described by Livnat et al. involves projecting a collimated beam of light through a first grating onto the specularly reflective surface. The light reflected by the surface is modulated by a second grating rotated at an angle $\Theta$ with respect to the first grating to form a Moire pattern which can be used to determine distance. A displacement of the surface causes the Moire pattern to shift, and this shift in the Moire pattern is detected and used to measure the distance moved by the surface. In general, Moire distance measuring techniques usually require both an optical grating projection system and an optical grating viewing system which have built-in equipment and implementation costs.

It is desired to achieve measurement results of prior art Moire distance measuring systems, but to do so with a system which has fewer components and therefore reduced cost.

SUMMARY OF THE INVENTION

The present invention is directed to a method and apparatus for Moire distance measurement. More particularly, the method comprises the steps of locating, forming or printing a first grating on a diffusely reflective surface to be measured; forming an image of the first grating on a second grating with an imaging means for forming a Moire pattern; and detecting changes in the Moire pattern as the diffusely reflective surface moves normal to the plane thereof for providing information relating to the distance of the diffusely reflective surface relative to an initial position.

The Moire distance measurement apparatus comprises a first grating, a second grating, an imaging means and an optical detecting means. More particularly, the first grating is located, formed or printed on a diffusely reflective surface to be measured. The imaging means forms an image of the first grating on the second grating to generate a Moire pattern. The optical detecting means optically detects a change in the Moire pattern as the diffusely reflective surface moves in a direction normal thereto, and provides information related to a distance measurement of the diffusely reflective surface relative from an initial position.

The invention will be better understood from the following more detailed description taken with the accompanying drawings and claims.

BRIEF DESCRIPTION OF THE DRAWINGS

The drawings are not necessarily to scale.

DETAILED DESCRIPTION

Figure 1:
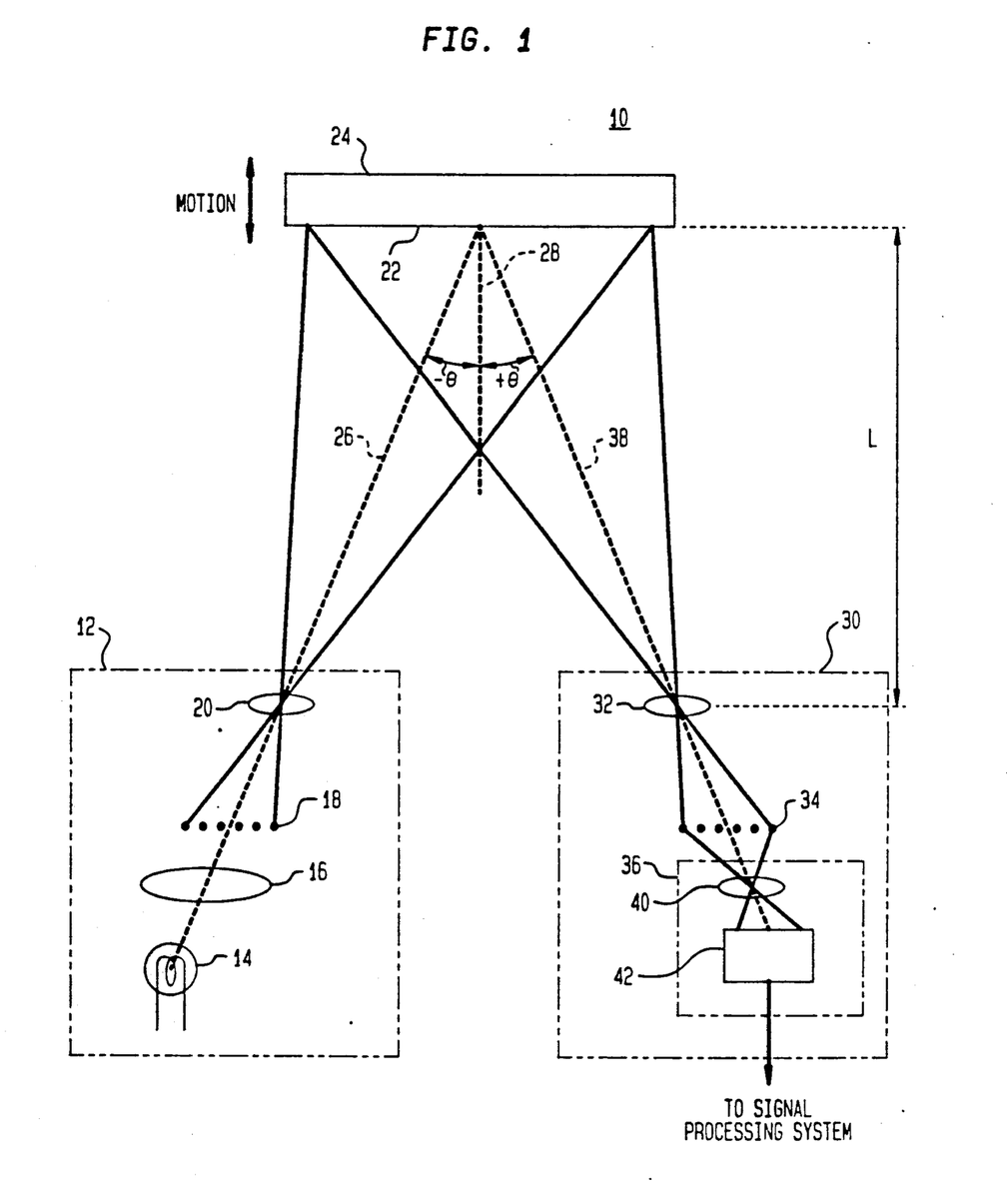
FIG. 1 is a top view of an exemplary prior art arrangement for the Moire distance measurement of a diffusely reflective surface of an object or support using a projection grating.

Referring now to FIG. 1, there is shown a top view of a Moire distance measurement system 10 using a projection grating 18 as disclosed in U.S. patent application Ser. No. 334,421 (filed on Apr. 6, 1989 and having a common assignee and inventorship with the present patent application). The system 10 comprises a first optical system 12 (shown within a dashed line rectangle) and a second optical system 30 (shown within a dashed line rectangle) which are used for Moire distance measurements of a diffusely reflective surface 22 of an object or support 24.

The first optical system 12 comprises a light source 14, a condenser lens 16, a first grating 18, and a projection lens 20. The light source 14 projects a beam of light through the condenser lens 16, the first grating 18, and the projection lens 20. The projection lens 20 is used to form an image (not shown) of the first grating 18 onto the diffusely reflective surface 22 of the object or support 24. An optical axis 26 of the projection lens 20 is arranged at an angle $-\Theta$ from a line 28 normal to the diffusely reflective surface 22. The first grating 20 may comprise, for example, a Ronchi ruling including a plurality of parallel wires or opaque lines with a period "P" therebetween.

The second optical system 30 comprises an imaging means 32 (hereinafter referred to as a viewing lens), a second grating 34 and detector means 36. Viewing lens 32 is positioned at a preselected distance (an initial position) "L" from the diffusely reflective surface 22 so as to facilitate reimaging of the projected image of the first grating 18, as found on the diffusely reflective surface 22, onto the second grating 34. System 10 is useful to accurately measure changes in position as the object 24 is moved parallel to line 28. The viewing lens 32 comprises an optical axis 38 arranged at the angle $+\Theta$ with respect to the line 28. The combination of (1) the image at the second grating 34 of the projected image of the first grating 18 from the diffusely reflective surface 22, and (2) the second grating 34 itself, form a Moire pattern (not shown). The resulting Moire pattern is imaged and received by the detector means 36. Detector means 36 comprises the lens 40 which focuses the Moire pattern onto a linear or area array 42 of optical sensing elements. Alternatively, the detector means 36 can comprise any suitable device such as a human eye, a photodetector, or a video camera. The changes in the Moire pattern found in the output signal from detector means 36, as the diffusely reflective surface 22 moves in a direction parallel to the normal 28, can be processed by any suitable processing system (not shown).

Several methods may be employed to detect the changing Moire pattern. In a first method, the image of the first grating 18 is reimaged onto the second grating 34 by lens 32. The reimage of the first grating 18 onto the second grating 34 and the second grating 34 are congruent (i.e., have the same period and are aligned in parallel). The resulting Moire pattern is a uniform field that changes from bright to dark to bright (i.e., shift by one fringe period) forming one contour interval "C", as the diffusely reflective surface 22 moves a predetermined distance in a direction parallel to line 28.

Deriving the relationship between the contour interval "C" and the system geometry is straight forward. The diffusely reflective surface 20 has moved one contour interval "C" when the image of the projected first grating 18 is displaced relative to the second grating 36 by the period of the gratings 18 and 34. The period $P_0$ of the projected image of the first grating 18 on the diffusely reflective surface 22 is defined by the equation $$P_0 = mP \quad (1)$$

where, P is the period of first grating 18; and m is the optical magnification defined by the equation $$m = (L-f)/f \quad (2)$$

where, L is the distance from diffusely reflective surface 22 to lens 20, and f is the focal length of lens 20.

The image of the projected first grating 18, found on diffusely reflective surface 22, is reimaged by the second lens 32 onto the second grating 34 which also has a period P. The reimage of the image of the first grating 18 and the second grating 34 itself are superimposed so that the transmitted light pattern seen by detector means 36 is the product (generally denoted as the Moire) of the two gratings. With the first and second grating lines being parallel, this transmitted light pattern seen by the detector means 36 is of uniform average intensity When aligned, the two grating patterns overlap and thus appear as one, and the average intensity is one half of the intensity that would be measured if there were no gratings in the system. More particularly, the transmission through a single grating is assumed to be one half intensity since the grating lines block one half the light, and it is also assumed that the individual grating lines are not resolved by the detector means 36. When the two grating patterns have a relative shift of a half period, the bright areas of the image of the projected first grating 18 from the diffusely reflective surface 22 are shifted and blocked by the lines of the second grating 34, and the detected intensity at the detector means 36 is zero. Therefore, as one grating is laterally shifted relative to the other by the movement of the diffusely reflective surface 22 in a particular direction, the transmitted average intensity seen by the detector means 36 varies periodically from a maximum intensity to a zero intensity and back again.

More particularly, as the diffusely reflective surface 22 moves in a first and then a second opposing direction parallel to line 28, the image of the projected grating on the surface 22 will appear to shift from side to side because this pattern will remain centered on the optical axis 26 of the projection lens 20. This shift is due to the obliquity built into the arrangement 10 by placing the first optical system 12 at an angle $\Theta$ with respect to the translation direction of the diffusely reflective surface 22. The shift "s" is defined by the equation $$s = d \tan(\Theta) \quad (3)$$

where d is the displacement of the diffusely reflective surface 22 parallel to line 28.

Even though the Moire pattern seen by the detector means 36 is formed by the superposition of the reimage of the projected image of the first grating 18 on the second grating 34, it is easier to visualize that the Moire pattern is formed on the diffusely reflective surface 22. With such visualization, the symmetry of the system 10 of FIG. 1 calls for a second grating 34 with the same period P as the first grating 18. An image of the second grating 34 on the diffusely reflective surface 22 then has the same period, but an opposite directional shift, as the image of the first grating 18 when the diffusely reflective surface 22 moves parallel to line 28. One contour interval "C" is deemed to be the longitudinal motion of the reflective surface 22 required to shift the two grating images relative to each other by one period $P_0$ (i.e., bright to dark to bright). For a displacement of a contour interval C, each grating will shift in its opposing direction by $P_0/2$ and, therefore, $$P_0/2 = C\tan(\Theta), \text{ or } C = P_0/(2\tan\Theta) \qquad (4)$$

It is to be understood that FIG. 1 shows the system 10 as being symmetrical about line 28 for purposes of simplicity of description, but the above results could also be accomplished with non-symmetric arrangements or with two gratings tilted relative to each other. With any of the non-symmetric arrangements, each arrangement will have a contour interval C specific to that arrangement. Then, by counting the number of cycles of intensity change in the Moire pattern with, for example, a photocell, the distance, in terms of contour intervals, that the diffusely reflective surface 22 has translated can be determined. The physical displacement can then be obtained through the conversion in Equation (4) using any suitable processing system.

Figure 2:
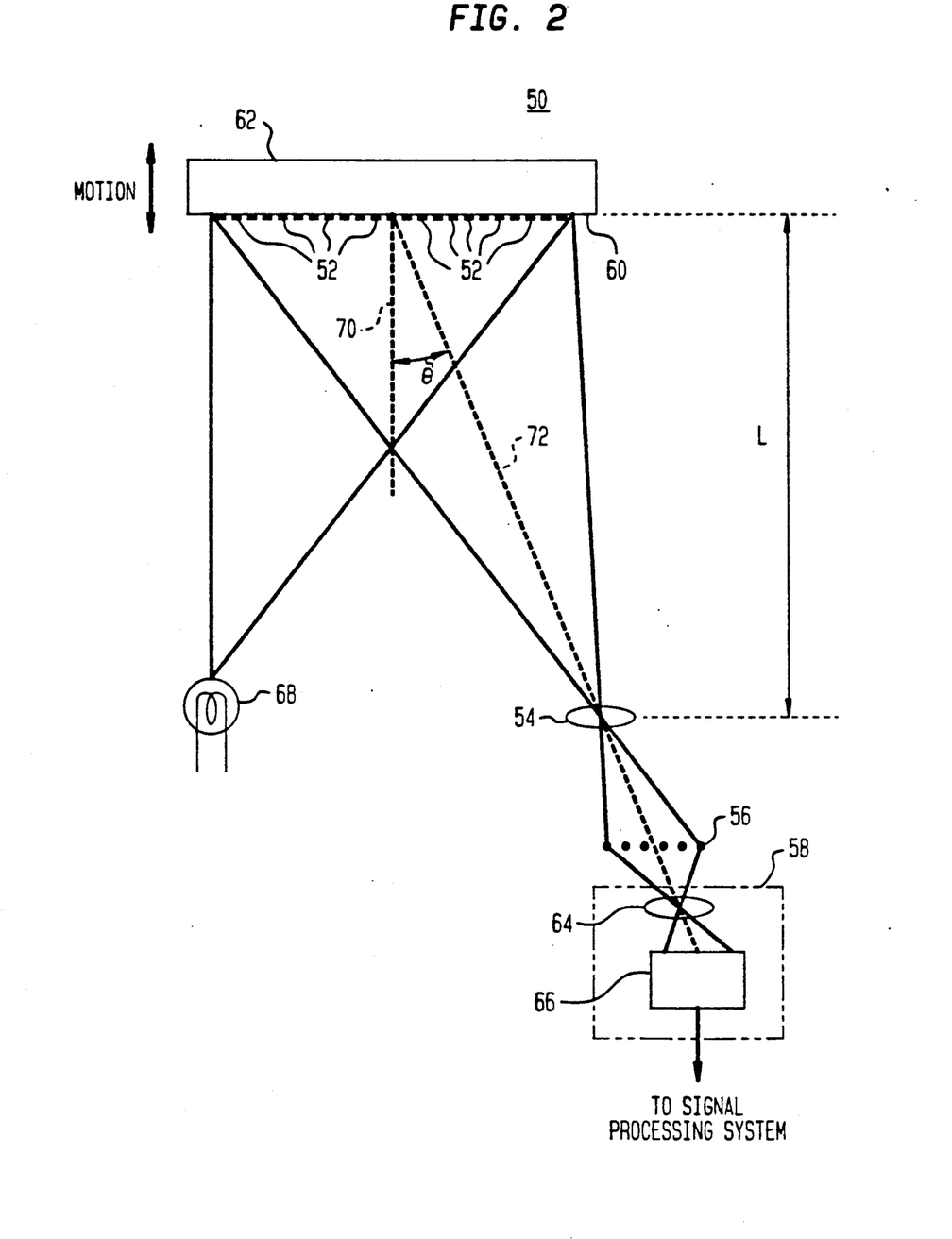
FIG. 2 is a top view of an arrangement for the Moire distance measurement of a diffusely reflective surface using a grating which is printed or physically located on the diffusely reflective surface in accordance with the present invention.

Referring now to FIG. 2, there is shown a Moire distance measurement system 50 in accordance with the present invention. System 50 comprises a first grating 52, a lens 54, a second grating 56, and a detector means 58. The first grating 52 has a predetermined period $P_0$ and is printed on, or physically attached to, a diffusely reflective surface 60 of an object or support 62. An image of the first grating 52 is formed by the lens 54 on the second grating 56. The lens 54 comprises an optical axis 72 arranged at the angle $\Theta$ with respect to the line 70 normal to the diffusely reflective surface 60. The combination of the image of the first grating 52 and the second grating 56 itself forms a Moire pattern. This Moire pattern is imaged onto the detector means 58. The detector means 58 comprises a lens 64 which focuses the Moire pattern onto a linear or area array 66 of optical sensing elements. Alternatively detector means 58 can comprise any suitable device such as a human eye, a photocell, or a video camera.

Essentially, the combination of the lens 54, the second grating 56, and detector means 58 are similar to the elements of the second optical system 30 of FIG. 1. The major difference between system 50 of FIG. 2 and system 10 of FIG. 1 is that the first optical system 12 of FIG. 1 is essentially eliminated, and a first grating 52 with a period $P_0$ has been placed on the diffusely reflective surface 60 and illuminated by a light source 68. Accordingly, system 50 has fewer components than system 10 of FIG. 1. It is to be understood, that the light source 68 in FIG. 2 is an unstructured light source (e.g., a light bulb) which can be placed anywhere to provide enough light to image the Moire pattern on the detector means 58. It is to be understood that for purposes of description hereinafter, the period $P_0$ of the first grating 52 in FIG. 2 is assumed to be the same as the period $P_0$ of the image of the first grating 18 on diffusely reflective surface 22 in FIG. 1 as shown in Equation (1).

To a first order, the system 50 of FIG. 2, with the printed or physically attached first grating 52, functions very similarly to the system 10 of FIG. 1. As the object or support 62 translates parallel to the line 70, the intensity or the Moire pattern received by the detector means 58 varies periodically, and changes once per contour interval. However, without a first optical system 12 as found in FIG. 1, there is no obliquity in the arrangement of FIG. 2, and the expression for C differs by a factor of 2 from that of equation (4) and is defined as:

$$C = P_0/(\tan\Theta). \qquad (5)$$

The major difference between the operation of the arrangements 10 and 50 of FIGS. 1 and 2, respectively, has to do with magnification and magnification changes. More particularly, in the system 10 of FIG. 1, as the distance L of the diffusely reflective surface 22 changes in a direction parallel to the line 28, the period $P_0$ of the pattern of the image of the first grating 18, found on the diffusely reflective surface 22, changes due to the magnification change caused by lens 20. In this regard see Equation (2). However, this change in magnification by lens 18 is compensated for by the lens 32 in the second optical system 30 which introduces and equal and opposite magnification change. Therefore, the period of the grating pattern imaged from the diffusely reflective surface 22 onto the second grating 34 remains constant, and remains matched to the period of the second grating 34. As a result, the matched gratings remain matched as the diffusely reflective surface 22 of the object or support 24 translates, and the grating images at the detector means 36 uniformly shift relative to each other over the entire Moire pattern.

With the system 50 of FIG. 2, however, this magnification change compensation does not take place since there is only one optical system, namely the equivalent of second optical system 30 of FIG. 1 with the printed grating 52 on the diffusely reflective surface 60. Therefore, as the diffusely reflective surface 60 translates parallel to the line 70, a magnification mismatch occurs between the two grating patterns at second grating 56. The magnification mismatch manifests itself as a spatially varying intensity pattern caused by the Moire between a first and second grating pattern of different periods that is seen by the detector means 58. A low spatial frequency beat pattern, generated by the different periods, has a period that decreases as the mismatch between the gratings increases, and for no mismatch, the beat period is infinite. Therefore, at the initial position for the Moire distance measurement, there is no beat pattern where the gratings patterns at second grating 56 match. As the object or support 62 moves away from this initial position, the beat frequency of the resulting Moire pattern increases.

When the diffusely reflective surface 60 translates in a direction parallel to the line 70, the beat pattern also appears to move across the image seen by the detector means 58, so that over a small area of the Moire pattern the needed periodic change in intensity still occurs to encode the amount of translation of the diffusely reflective surface 60. One way to view this magnification change for the system 50 of FIG. 2 is that the contour interval C varies across the field of view of the lens 54 (corresponding to different points on the second grating 56), and that for each location the contour interval C is constant.

Figure 3:
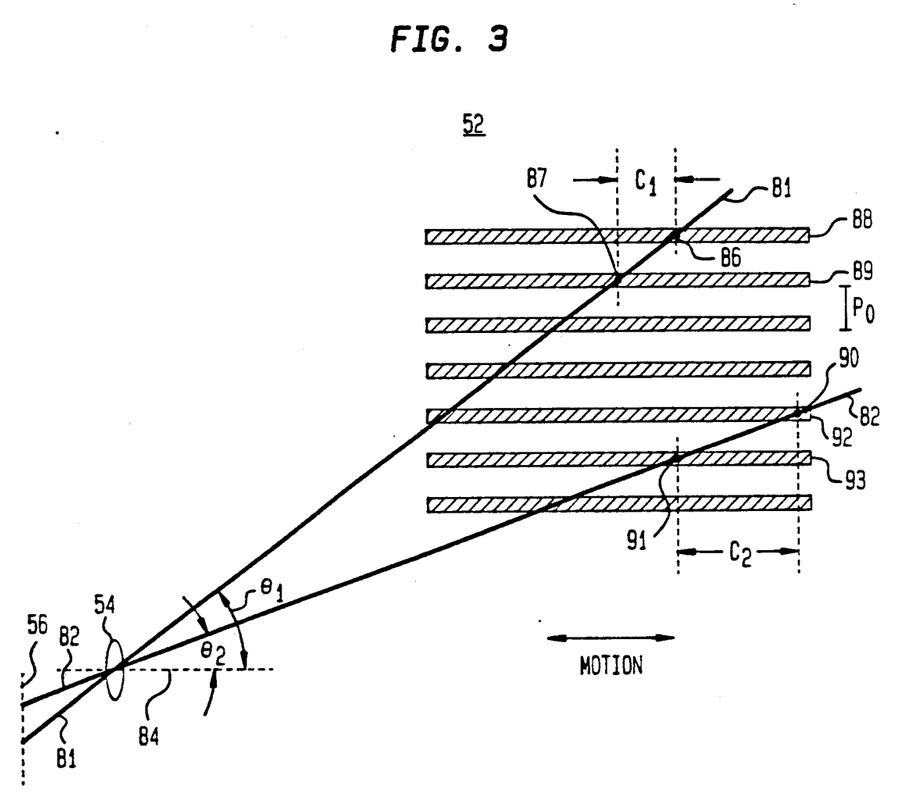
FIG. 3 is a diagram for explaining the variation of the contour interval relative to viewing angle occurring with the arrangement of FIG. 2.

Referring now to FIG. 3, there is shown a diagram including a plurality of parallel dashed rectangular areas (four of which are shown with reference numbers 88, 89, 92 and 93) associated with the first grating 52, the lens 54 with an axis 84, the second grating 56, and first and second rays of light designated 81 and 82 which are oriented at different viewing angles $\Theta_1$ and $\Theta_2$, respectively, from second grating 56 to the dashed rectangular areas. FIG. 3 is useful to explain the variation in contour intervals relative to the viewing angles, and provides an understanding of the statement above that each location has a constant contour interval. It is to be understood that the dashed horizontal rectangular areas are not actual grating lines. Rather, these dashed rectangular areas represent the volumes of space that are swept out by the lines of the first grating 52 as the diffusely reflective surface 60 of FIG. 2 translates (moves from one position to another). Additionally, these horizontal rectangular areas maintain a fixed period or spacing $P_0$ corresponding to the period of the first grating 52.

The first and second light rays labeled 81 and 82, respectively, at the respective angles $\Theta_1$ and $\Theta_2$ from the axis 84 of lens 54, represent light rays from different part of the field of view of the lens 54. It should be noted that both of lines 81 and 82 go through the center of the lens 54 (or more accurately the center of the entrance pupil) and start at different locations on the second grating 56. These rays may also be interpreted as defining the fields of view of the elements of the optical sensing array 66 of the detector means 58 of FIG. 2 to record the intensity measurements at each location.

The contour interval C for each of these rays, or detector means sensing elements, is found by determining the distance in the z-axis direction (parallel to the translation direction of the diffusely reflective surface 60) between intersections of a given ray and the centers of adjacent volumes of space of the grating lines of first grating 52. For example, the distance between the intersection of ray 81 and each of the centers 86 and 87 of adjacent dashed volumes of space 88 and 89, respectively, is labeled $C_1$. Similarly, the distance between the intersection of ray 82 and the centers 90 and 91 of adjacent volumes of space 92 and 93 is labeled $C_2$. It is important to note that when the diffusely reflective surface 60 of FIG. 2 translates a predetermined distance $C_1$, ray 81 moves between the centers of the adjacent volumes of space 88 and 89.

More particularly, if the diffusely reflective surface 60, with the first grating 52 thereon, starts in a position where its intersection with ray 81 occurs at point 86 of volume 88, a translation of surface 60 by a distance $C_1$ towards lens 54 will change the intersection of ray 81 with surface 60 from point 86 of volume 88 to point 87 of volume 89. Similarly, when the diffusely reflective surface 60, with the first grating 52 thereon, translates a distance $C_2$ towards lens 54, the intersection of ray 82 with surface 60 will change from point 90 in volume 92 to point 91 in volume 93. This construction shows that the Moire pattern will change from light to dark to light as it traverses between adjacent lines on first grating 52. The contour intervals for rays 81 and 82 are, therefore, different and are equal to the distances $C_1$ and $C_2$, respectively. The contour intervals $C_1$ and $C_2$ are defined by the relationships:

$$C_1 = P_0/(\tan\Theta_1); \text{ and } C_2 = P_0/(\tan\Theta_2). \quad (6)$$

It is important to note that the equations for the contour intervals $C_1$ and $C_2$ use Equation (5) evaluated at two different angles, and this result simply reflects the fact that the viewing angle $\Theta$ varies across the diffusely reflective surface 60 of the object or support 62 of FIG. 2. These separate contour intervals $C_1$ and $C_2$ are also constant, as the same result is obtained anywhere along each of the rays 81 and 82 between adjacent volumes of space indicated by the dashed lines of FIG. 3. The system 50 of FIG. 2 can, therefore, be interpreted to obtain a Moire distance measurement by applying the contour interval appropriate for a given location on the array 66 of the detector means 56. To convert the number of contour intervals to a translation distance of the object or support 62, the value of the contour interval as shown in equation (6) is needed. Since this value of the contour interval depends on several factors such as detector location, a solution is to experimentally calibrate the system 50 of FIG. 2. For calibration purposes, the system 50 is set up with known dimensions, and the object or support 62, with diffusely reflective surface 60 and first grating 52, is translated a known distance parallel to the line 70. The resultant measurement indicates a certain number of contour intervals. Then, by dividing the known distance by the measured number of contour intervals, the value of the contour interval for the setup of arrangement 50 is obtained.

The following discussion is presented for providing an understanding of what is happening in the Moire pattern produced by the system 50. When the diffusely reflective surface 60 is located at the initial distance L, the image of first grating 52 is superimposed on and matches the period P of the second grating 56 by lens 54. Therefore, the resulting Moire pattern appears as uniformly spaced alternating bright and dark vertical lines having a period P when the lines of the image of the first grating are aligned with the lines of the second grating 56. As the diffusely reflective surface 60 translates from this initial position in a first direction parallel to the line 70, not only does the image of the first grating 52 shift to one side relative to second grating 56, but the image of the first grating 52 also concurrently changes in size because of the change in the magnification factor. The result is that at the center of the pattern a bright-dark-bright change is seen, while as one goes towards the edges of the Moire pattern these bright-dark-bright changes go out of phase at different rates as indicated by the changing contour interval relative to viewing angle in FIG. 3.

It is to be understood that the specific embodiments described herein are intended merely to be illustrative of the spirit and scope of the invention. Modifications can readily be made by those skilled in the art consistent with the principles of this invention. For example, there is no strict requirement on the quality of the first grating 52. The first grating 52 could be printed on stickers and placed on the object or support 62 as the need arises. For monitoring parts in production, the first grating 52 could be molded into the part or placed on the part as a step in some other manufacturing process. Still further, the system 50 according to the present invention also works if a rotation is introduced between the first and second gratings. In this case, a fixed "horizontal" Moire pattern (perpendicular to the Moire pattern introduced by the object or support 62 translation) appears in the image that is transmitted through the second grating 56. Still further, at the output of the detector means 58, any suitable signal processing system can be used such as a system similar to that disclosed in U.S. Pat. No. 4,794,550 (issued to J. E. Greivenkamp on Dec. 27, 1988). More particularly, a computer can be used that is programmed to count the total number of contour intervals occurring in the output signal of the detector means 58. The computer can dynamically add this total number of contour intervals to a current partial contour interval detected for determining the current distance measurement.

Having thus described my (our) invention, what I (we) claim as new and desire to secure Letters Patent is:

1. A method of providing Moire distance measurements comprising the steps of:
   (a) locating, forming, or printing a first grating on a diffusely reflective surface to be measured;
   (b) forming an image of the first grating on a second grating with an imaging means for producing a Moire pattern; and
   (c) detecting changes in the Moire pattern as the diffusely reflective surface moves normal to a plane thereof for providing information related to the distance of the diffusely reflective surface relative from an initial position.

2. The method of claim 1 wherein in step (b), arranging an optical axis of the imaging means at a predetermined acute angle with respect to a line normal to the diffusely reflective surface.

3. The method of claim 1 wherein in step (b), forming the image of the first grating with a period that matches the period of the second grating when the diffusely reflective surface is located at the initial distance.

4. The method of claim 3 wherein in step (b), forming the image of the first grating with a period that does not match the period of the second grating, which produces a magnification mismatch that manifests itself as a spatially varying intensity pattern caused by the Moire between a pattern of the image of the first grating and a pattern of the second grating, when the diffusely reflective surface is not at the initial position.

5. The method of claim 4 wherein in step (c) performing the substeps of:
   (c1) determining the dimension of a contour interval at a preselected point in the Moire pattern, the contour interval being representative of the movement of the diffusely reflective surface required to shift the image of the first grating relative to the second grating by one period and is dependent on a predetermined viewing angle relative to an axis of the imaging means for the preselected point; and
   (c2) counting the number of contour intervals produced by the shifting of the image of the first grating relative to the second grating at the preselected point to determine the number of contour intervals for providing the information related to the current distance of the diffusely reflective surface relative from the initial position.

6. The method of claim 1 wherein in step (c) the Moire pattern changes are detected using a light detector.

7. The method of claim 1 wherein in step (c) the Moire pattern changes are detected using a video camera.

8. Moire distance measurement apparatus comprising:
   a first grating which is located, formed, or printed on a diffusely reflective surface to be measured;
   a second grating;
   imaging means for forming an image of the first grating on the second grating to generate a Moire pattern; and
   means for optically detecting a change in the Moire pattern as the diffusely reflective surface moves in a direction normal thereto, and for providing information related to a distance measurement of the diffusely reflective surface relative from an initial position.

9. The Moire distance measurement apparatus of claim 8 wherein an optical axis of the imaging means is arranged at a predetermined acute angle with respect to a line normal to the diffusely reflective surface.

10. The Moire distance measurement apparatus of claim 8 wherein:
    the first grating comprises opaque and non-opaque parallel lines or areas with a first predetermined period therebetween; and
    the second grating comprises opaque and non-opaque parallel lines or areas with a second predetermined period that matches the period of the image of the first grating when the imaging means is located at the initial distance from the diffusely reflective surface.

11. The Moire distance measurement apparatus of claim 10 wherein the second grating comprises a period which does not match the period of the image of the first grating when the diffusely reflective surface moves from the initial distance, whereby a magnification mismatch occur that manifests itself as a spatially varying intensity pattern caused by the Moire between a pattern of the image of the first grating and a pattern of the second grating.

12. The Moire distance measurement apparatus of claim 11 wherein the optical detecting means comprises means for counting the number of contour intervals produced by a shifting of the image of the first grating relative to the second grating at a preselected point in the Moire pattern to determine the number of contour intervals for providing the information related to the current distance of the diffusely reflective surface from the initial position when the counting is started, the contour interval being representative of the movement of the diffusely reflective surface required to shift the image of the first grating relative to the second grating by one period and is dependent on a predetermined viewing angle relative to an axis of the imaging means for the preselected point.

13. The Moire distance measurement apparatus of claim 8 wherein the means for detecting comprises a light detector.

14. The Moire distance measurement apparatus of claim 13 wherein the light detector is a video camera.

15. A Moire distance measurement system for measuring the distance or displacement of a diffusely reflective surface of an object or support, the system comprising:
    a first grating physically located, formed, or printed on the diffusely reflective surface comprising opaque and non-opaque parallel lines or areas with a predetermined period therebetween;
    a light source for illuminating the diffusely reflective surface of the object or support;
    an imaging means for forming an image of the first grating;
    a second grating positioned at the image of the first grating comprising opaque and nonopaque parallel lines with a predetermined period that matches the period of the image of the first grating when the imaging means is at an initial distance; and
    detecting means for viewing resultant Moire patterns produced by the first and second gratings.

16. The Moire distance measurement apparatus of claim 15 wherein the second grating comprises a period which does not match the period of the image of the first grating when the diffusely reflective surface moves from the initial distance in a direction normal to the surface, whereby a magnification mismatch occurs that manifests itself as a spatially varying intensity pattern caused by the Moire between a pattern of the image of the first grating and a pattern of the second grating.

17. The Moire distance measurement apparatus of claim 16 wherein the detecting means comprises:

means for counting the number of contour intervals produced by a shifting of the image of the first grating relative to the second grating at a preselected point in the Moire pattern to determine the number of contour intervals for providing the information related to the current distance of the diffusely reflective surface from the initial position, the contour interval being representative of the movement of the diffusely reflective surface required to shift the image of the first grating relative to the second grating by one period and is dependent on a predetermined viewing angle relative to an axis of the imaging means for the preselected point.

18. The Moire distance measurement apparatus of claim 15 wherein the detecting means comprises a light detector.

19. The Moire distance measurement apparatus of claim 18 wherein the light detector is a video camera.

* * * * *